M. V. WHITING.
GRASSHOPPER CATCHER.
APPLICATION FILED OCT. 15, 1909.
970,004.
Patented Sept. 13, 1910.
2 SHEETS—SHEET 1.
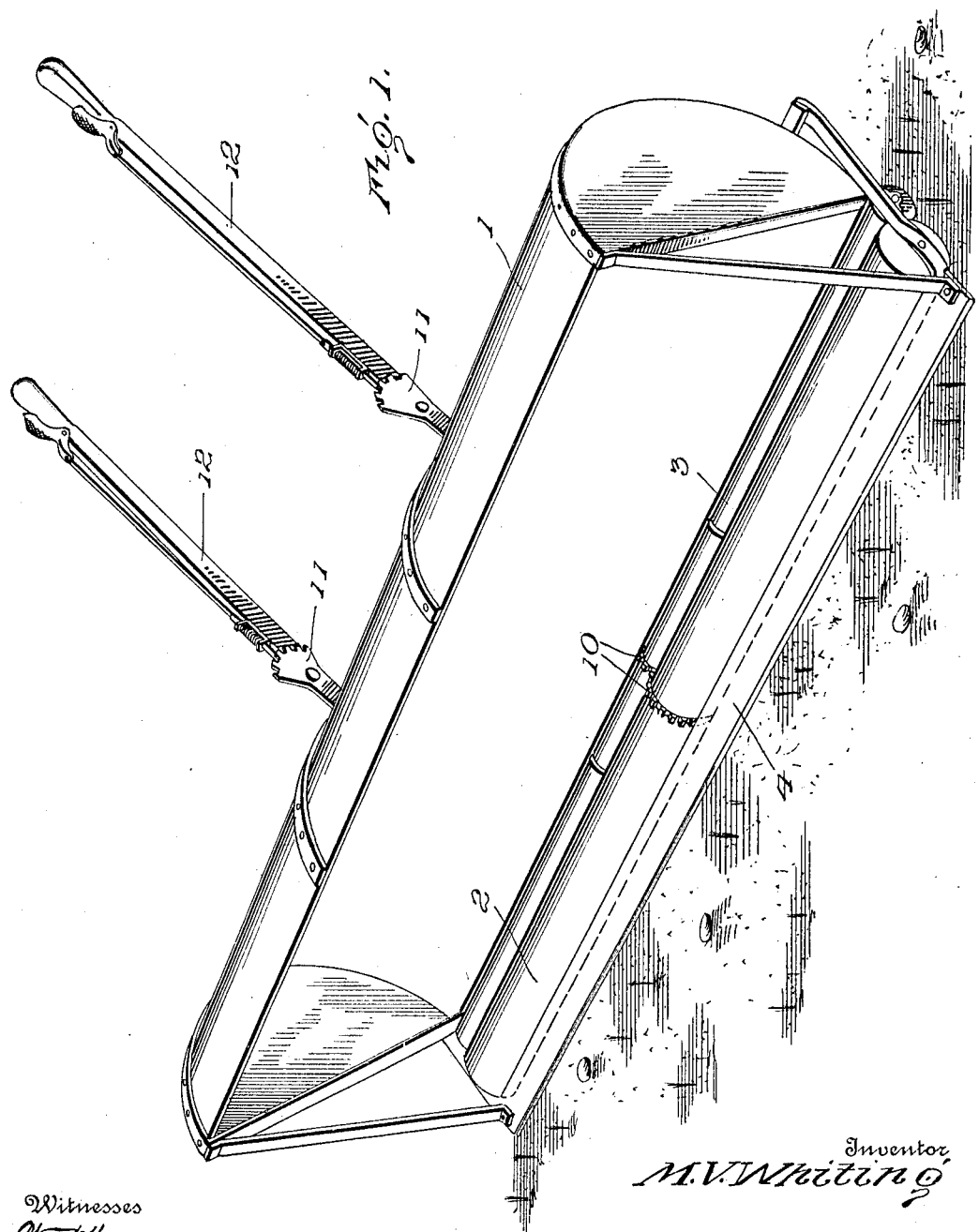

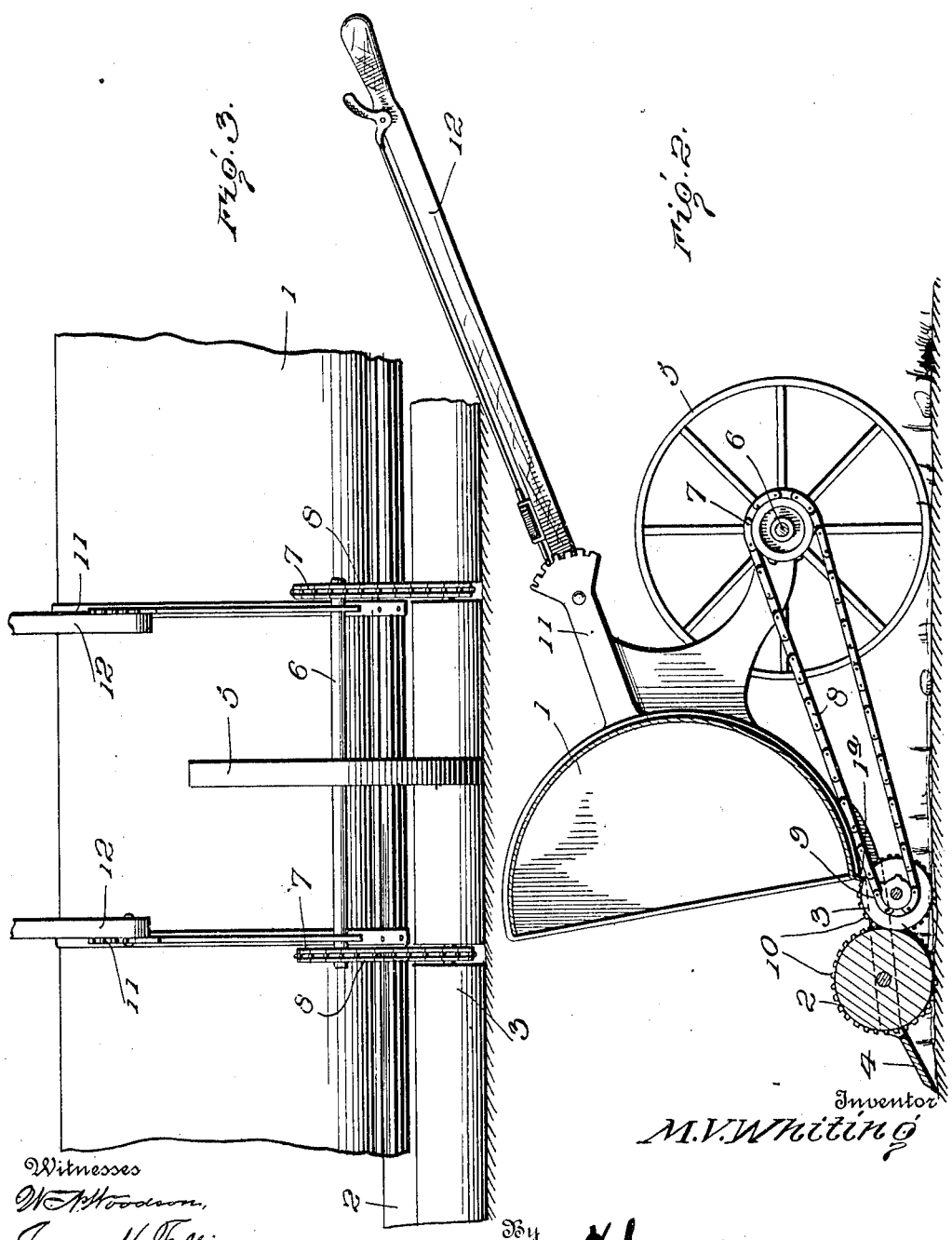

UNITED STATES PATENT OFFICE.

MILTON V. WHITING, OF DENVER, COLORADO.

GRASSHOPPER-CATCHER.

970,004.  Specification of Letters Patent.  Patented Sept. 13, 1910.

Application filed October 15, 1909. Serial No. 522,831.

*To all whom it may concern:*

Be it known that I, MILTON V. WHITING, citizen of the United States, residing at Denver, in the county of Denver and State of Colorado, have invented certain new and useful Improvements in Grasshopper-Catchers, of which the following is a specification.

The object of my invention is a simple, durable and efficient construction of device for killing grasshoppers and other similar insects that are destructive to growing crops.

The invention consists essentially in a hood adapted to be wheeled over the fields and designed to catch the grasshoppers as they jump from the grass or the like, and rollers coacting with said hood and designed to crush the grasshoppers between them as they strike the hood and are deflected thereby down on the rollers.

The invention also consists in certain constructions and arrangement of the parts that I shall hereinafter fully describe and claim.

For a full understanding of the invention reference is to be had to the following description and accompanying drawings, in which:—

Figure 1 is a perspective view of my improved grasshopper killer. Fig. 2 is a longitudinal section thereof, and Fig. 3 is a rear elevation of a portion of the device.

Corresponding and like parts are referred to in the following description and indicated in all the views of the accompanying drawings by the same reference characters.

Referring to the drawings, the numeral 1 designates a hood which may be of any desired size, and formed of any desired metal or material, the inner wall thereof being preferably polished or smoothed so that the grasshoppers will fall downwardly after they fly into the hood and strike the wall of the same. At the lower edge of the hood 1 and preferably extending throughout the length thereof, it being understood that the hood is arranged transversely to the line of travel of the device, are front and rear rollers designated 2 and 3 respectively, the rollers being supported in any desired framework which may extend from the hood as shown, and being mounted with their peripheries in contact with each other so that the grasshoppers will be caught and crushed between the rollers when they fall down upon the same after they strike the hood. In advance of the rollers 2 a scraping blade 4 is mounted, the same being secured at its ends in the side bars of the framework. The rear edge of this blade 4 engages the periphery of the roller 2 so as to keep the same clean, and in addition to this function, the said blade will serve to start up the grasshoppers in the operation of the device.

It is intended to wheel the device over the fields, and for this purpose any number of wheels may be employed. In the present instance the device is mounted on a single wheel designated 5, the same carrying a transversely extending shaft 6 on which the sprocket wheels 7 are mounted. Chains 8 extend around the sprocket wheels 7 and also around preferably relatively small sprocket wheels 9 secured to the shaft of the rear roller 3, in recesses that are formed therein whereby to impart motion to such roller. Motion is transmitted from the roller 3 to the front roller 2 by means of spur gear wheels 10 that are secured to the respective rollers, preferably at the middle thereof, as clearly illustrated in the drawings.

11 designates handles which include relatively stationary portions that are secured to the hood 1 and braced in any desired way, said handles extending rearwardly, as shown and also including hand levers 12 that are adapted to be adjusted about horizontal axes and having detents which are adapted to engage toothed segments on the relatively stationary portions of the handles as shown. By this means the height of the machine may be adjusted, as desired. Preferably the rear roller 3 is kept clean by a scraper blade 1ª which is formed by the lower edge of the hood 1.

From the foregoing description in connection with the accompanying drawings, the operation of my improved grasshopper catcher will be apparent.

In the practical use of the device, the operator grasps the hand-levers 12 after adjusting them so that the machine will be maintained at the desired height, and the device is pushed over the fields, the blade 4 stirring up the grasshoppers and causing them to jump upwardly, when they will be caught by the hood 1 and fall down upon the rollers 2 and 3 and be crushed by the same.

Manifestly the parts of the device may be cheaply manufactured and easily assembled and are comparatively few in number and of simple construction that will not be liable to get out of order.

Having thus described the invention what is claimed as new is:—

1. A device of the character described, embodying a wheeled support, including a rotatable shaft, a hood mounted on said support, crushing rollers also mounted on the support at the bottom of the hood, sprocket wheels carried by the shaft, chains extending over said sprocket wheels, one of said rollers embodying a shaft, and formed with recesses, and other sprocket wheels secured to said last-named shaft in said recesses, the sprocket chains extending around the last named sprocket wheels also.

2. A device of the character described, embodying a wheeled support including a rotatable shaft, a hood mounted on said support, crushing rollers journaled in said support at the bottom of the hood and in advance thereof, and one in advance of the other, scraper blades arranged to scrape the rollers, one of said blades being mounted in advance of the foremost roller, and the other blade engaging the rearmost roller and being formed by the lowermost edge of the hood, and a driving connection between the rollers and the shaft.

3. A device of the character described, embodying a support, a wheel, a shaft carried by the wheel and extending laterally therefrom on both sides thereof, connections between the shaft and support, a hood carried by the support, sprocket wheels mounted on the ends of said shaft, front and rear rollers journaled in the support at the bottom of the hood, sprocket wheels carried by the rearmost roller, chains extending over the first and last named sprocket wheels, and pinions secured to the respective rollers and meshing with each other, for the purpose specified.

In testimony whereof I affix my signature in presence of two witnesses.

MILTON V. WHITING. [L. S.]

Witnesses:
S. A. GORMLEY,
JOHN R. SMITH.